Jan. 19, 1965   F. D. WAMPLER ETAL   3,166,438
ELECTROSTATIC PAINTING APPARATUS
Filed Nov. 23, 1960   9 Sheets-Sheet 1

INVENTORS
Frank D. Wampler
Howard E. Smith
John E. Marman
BY Carl A. Stickel
THEIR ATTORNEY INVENTORS
Frank D. Wampler
Howard E. Smith
John E. Marman
BY
Carl A. Stickel
THEIR ATTORNEY

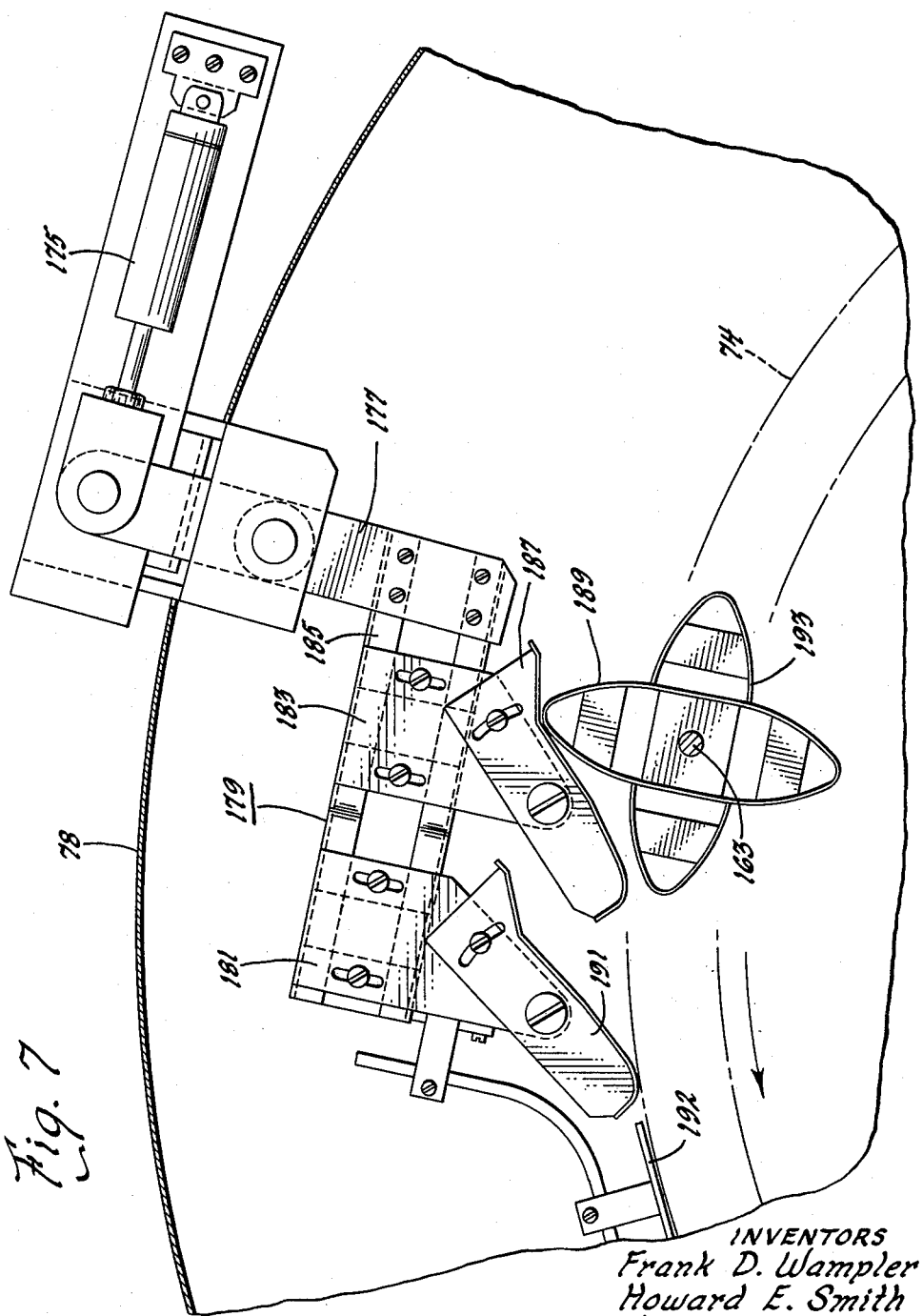

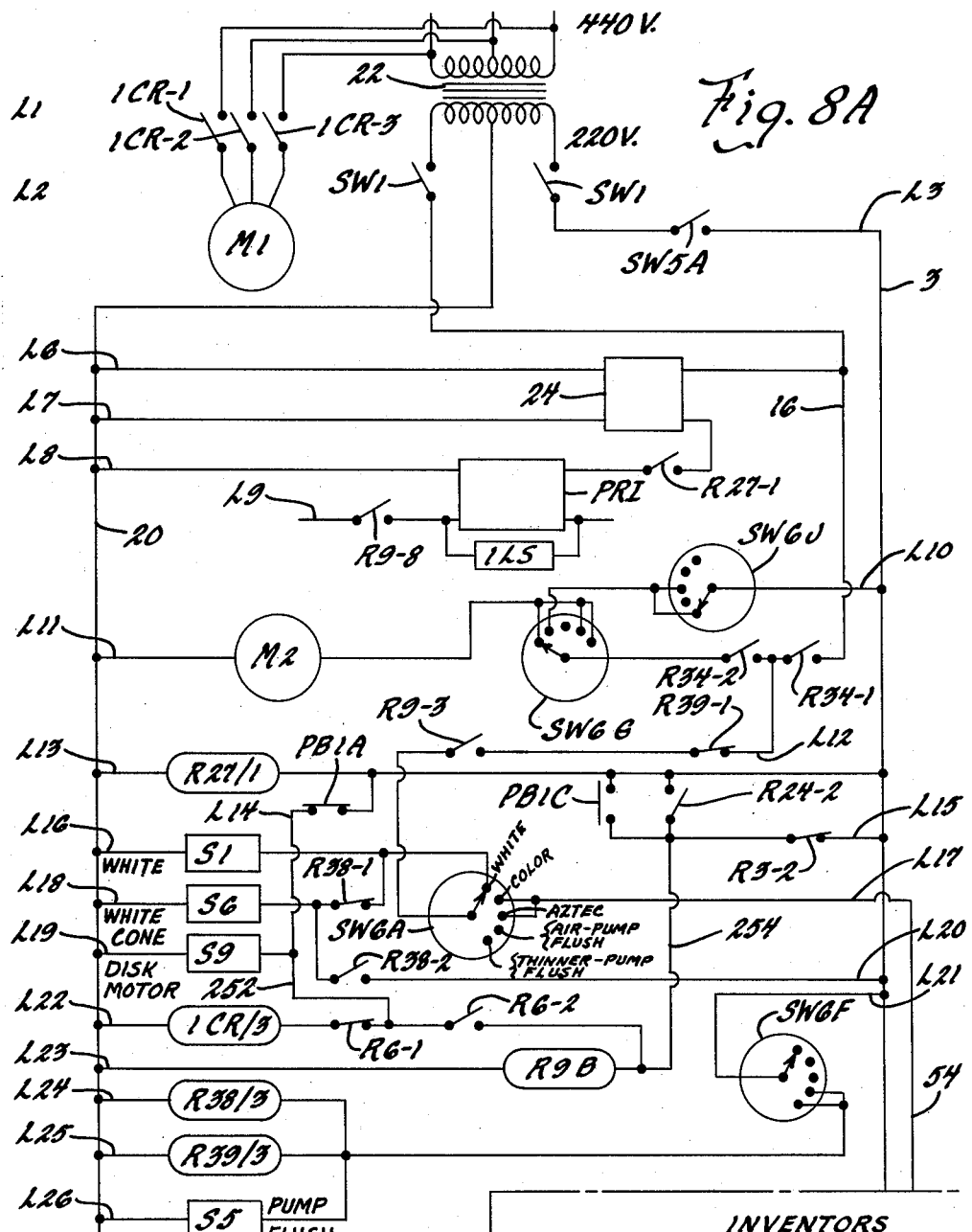

United States Patent Office 3,166,438
Patented Jan. 19, 1965

3,166,438
ELECTROSTATIC PAINTING APPARATUS
Frank D. Wampler, Brookville, and Howard E. Smith and John E. Marman, Dayton, Ohio, assignors to General Motors Corporation, Detroit, Mich., a corporation of Delaware
Filed Nov. 23, 1960, Ser. No. 71,325
14 Claims. (Cl. 118—2)

This invention relates to electrostatic painting apparatus and, more particularly, to automatically applying paint coatings to large objects of different sizes in conformity with their dimensions as they are continuously presented by a conveyor.

The electrostatic application of paint is used to eliminate hand spraying operations and to minimize the waste of paint and provide higher production. The problems of such painting increase when they are applied to objects of different types and sizes continuously presented by a conveyor. The problems also increase when different colors are required.

It is an object of this invention to provide an electrostatic painting apparatus which is available for high speed production at a high proportion of time with little maintenance or interruption to operations.

It is another object of the invention to provide an automatic stoppage of paint and flushing the paint delivery apparatus when changing colors and also when there is danger of the paint hardening without depositing the paint upon the conveyor apparatus.

It is another object of this invention to provide a painting apparatus in which the paint delivery means is continuously reciprocated automatically through an amplitude or amplitudes corresponding to the different dimensional limits of the articles presented, measured parallel to the surfaces to be painted and the direction of reciprocation.

It is another object of this invention to provide a conveyorized painting apparatus in which no individual mechanical preparation is required for automatic control of the paint delivery to surfaces of different dimensions to be painted but in which the obstruction of light beams by the articles is used to make the control of the paint delivery correspond to the linear dimensions of the surface to be painted.

It is another object of this invention to provide a conveyorized painting apparatus in which a quick change can be made from one color paint to another color paint with an automatic brief flush cycle intervening.

It is another object of this invention to provide a conveyorized painting apparatus in which some hangers supporting different articles are turned during the spray painting while others are not turned by an automatic arrangement.

It is another object of this invention to provide an improved arrangement of single pole, double throw photoelectrically controlled switch means for controlling a succession of limiter controls.

These and other objects are attained in the form shown in the drawings in which the articles to be painted are carried through a painting booth around a vertically reciprocating paint distributing cone which is electrostatically charged. Spotlights cast their beams upon photoelectric cells across the path of the objects for the purpose of controlling the flow of paint to the paint distributing cone when the beams are obstructed and for the purpose of flushing the paint distribution system and the cone in the event that no articles to be painted are presented for a period of time sufficient to cause a danger of the hardening of the paint. Provisions are also made for the selection of different colors of paint and to hold the color selected in alternate paint supply lines and for filling the alternate lines during the painting of another color. The change of paint from one color to another is made by a simple selector with an automatic flush intervening between the change of one paint to another. This change is made without stopping the conveyor apparatus and requires only that a few spaces or empty hangers be left between the articles to be painted with one color of paint and articles to be painted with another color of paint. A separate system is also provided for metallic paints to minimize fire hazards. The photoelectric cell system is connected in a series arrangement so as to control the stroke of the reciprocating paint distributor in conformity to the corresponding dimensions of the articles being painted through a limit control system.

Further objects and advantages of the present invention will be apparent from the following description, reference being had to the accompanying drawings wherein a preferred embodiment of the present invention is clearly shown.

In the drawings:

FIGURE 7 is a plan view, partly diagrammatic, of the hanger turning arrangement, part of which is shown in phantom in FIGURE 1; and FIGURES 8A to 8D, inclusive, are the wiring diagram for controlling the paint spraying system illustrated in FIGURES 1 to 7.

Figure 1:
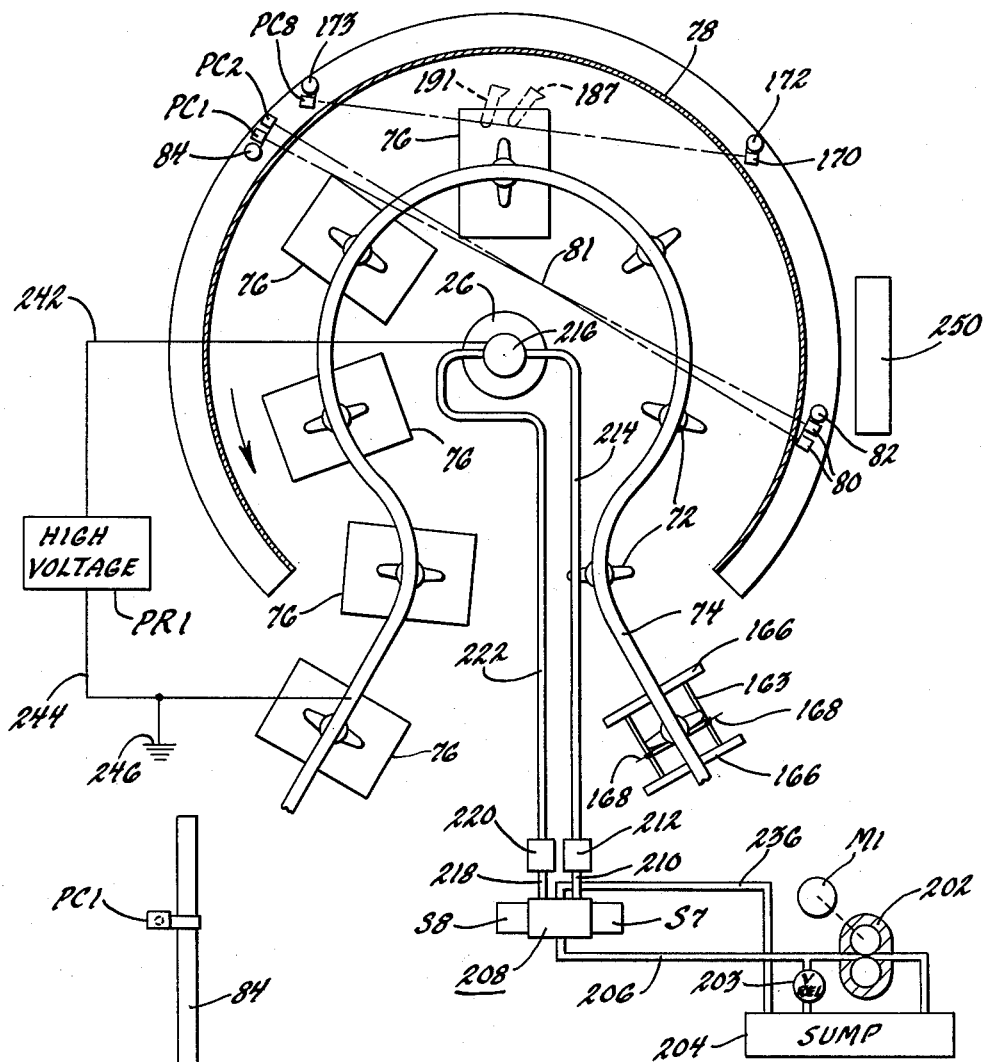
FIGURE 1 is a top view, partly diagrammatic, of an electrostatic paint spraying system embodying one form of my invention.

Referring now more particularly to FIGURES 1 to 4, the articles to be painted or coated, such as the cabinets 76 of varying length and the doors 165 also of different lengths and sizes, are carried upon a monorail conveyor 74 having a loop portion within a circular booth 78 surrounding a coating or paint spraying mechanism. This paint spraying mechanism essentially comprises a coating device such as a reciprocating cone 26 rotated at high speed and electrostatically charged relative to the conveyor 74 so that the paint centrifugally thrown in the form of minute particles from the rim of the cone 26 will be attracted to the articles upon the conveyor so that substantially all the paint is deposited on these articles. The monorail conveyor 74 presents the cabinets 76 front forward to the spray cone in the booth 78. This insures that the front edges of the cabinets receive an adequate amount of paint in preference to the rear edges thereof. The monorail conveyor 74 is provided with hangers 72 for supporting the cabinets 76. The cabinets are moved along the monorail 74 at a rate of about six per minute. They travel in a counterclockwise direction on the conveyor as viewed in FIGURE 1 so that the side presented receives the proper amount of paint. The opposite side is painted in another booth.

The doors 165 only have both of their edges painted in the booth 78 and their hangers 163 are provided with special flags or shields 167 which obstruct the light from the spotlight 169 to the photo cell PC8 at the mid point of their path through the booth 78 so as to actuate the turning mechanism shown in detail in FIGURE 7. Sufficient paint is applied in one half the travel through the booth 78 upon the one edge so that the paint can also be applied to the opposite edge of the doors by turning them at the mid point of their movement in this manner. The paint is delivered from the paint supply through either the valve blocks 40 or 159 into the center of the cone 26 which is rotated at high speed by the air motor 28 located at the bottom of the guide rod 228 which is reciprocated by the piston 224 within the cylinder 216. The reciprocation is provided by a hydraulic pump 202 driven by an electric motor M1 which pumps hydraulic liquid to the reversing valve 208 which delivers the hydraulic liquid alternately to the opposite ends of the cylinder 216.

Figure 2:
FIGURE 2 is a view in elevation showing the vertical location of the photoelectric cells shown in FIGURE 1.

The bottom solenoid S8 and the top solenoid S7 of the reversing valve 208 are controlled by the limit switches LS1 to LS10, inclusive, in conjunction with the photo cells PC1 to PC7 shown in FIGURE 2 as the cabinets and doors obstruct or fail to obstruct the light to these cells. These cells thereby control the effectiveness of the limit switches to control the stroke of the piston 224 and the cone 26 in conformity to the vertical dimensions of the cabinets 76 and the doors 165. The details of construction are described in connection with the details of the operations. This application particularly with respect to the photoelectric control providing automatic adjustment of the spray cone coating device and automatic stopping of the flow of paint and automatic flushing of the painting apparatus is a continuation-in-part of our copending application Serial No. 16,786, filed March 22, 1960.

*White painting*

To start the operation of the paint spray system, the manual switches SW1 (L2) and SW5A (L3) upon the control panel 250 are closed connecting the end terminals of the transformer 22 with the conductors 16 and 3. The neutral conductor 20 on the left side is always connected to the neutral terminal of the 440 volt-118 volt, three phase transformer 22. The relay R27/1 (L13) is thereby continuously energized to close the contacts R27-1 (L8), thus closing the secondary from the 1-kva. Sola voltage regulating transformer 24 (L6, 7) to the Ionic high voltage direct current power pack unit PR1 (L8, 9) providing an output at 110,000 volts to apply the electrostatic charge to the coating material or paint issuing from the coating disk or cone 26. The 1-kva. Sola transformer is energized by the closing of the second SW1 contact. If an electric motor is used, the PR1 disk or cone control for the disk or cone 26 (FIGURE 3) is energized in parallel with the Ionic high voltage unit to energize the disk motor. Preferably, the air motor 28 supplied with air from an air pressure supply 27 is used for rotating the disk 26. This motor is operated upon the energization of the solenoid S9 (L19) which opens the air valve 29 to the air disk motor 28 through the normally closed contacts PB1A (L14) in a circuit in parallel with the relay R27/1 (L13). The motor 28 rotates the cone 26 at high speed to centrifuge paint in fine particles therefrom onto the cabinets 76. Also in parallel with the solenoid S9 is the contactor 1CR/3 (L22) which is energized through the normally closed contacts R6/1 (L22) of relay R6/2 (L38). The contactor 1CR closes the 440 volt, three phase contacts 1CR-1, 2, 3 (L1) to the hydraulic pump motor M1 which reciprocates the spray disk or cone 26.

The 117 volt conveyor circuit (L55, 59, 60) is energized to start the monorail conveyor system 74 (FIGURE 1) driven by the motor CM, thereby energizing the relay R3/4. This closes contacts R3-1 (L64) to energize, through the normally closed contacts R7-3, R33-3, R24-1, the normally closed push button PB1B and the normally closed contacts R44-3, the paint and high voltage latch relay R9A/9.

This closes contacts R9-1 (L35) to energize through the normally closed contacts R39-3 the relay R34/2 (L34). This relay connects through the switch SW6B in the white No. 1 position or color No. 2 position or the Aztec copper No. 3 position and through the high voltage control contacts 1LS and the air pressure switch contacts 1PS (L33) to the neutral conductor 20. The high electrostatic voltage and adequate air pressure close the switches 1LS and 1PS permitting paint flow. The rotary switches SW6A to J, inclusive, are connected together for simultaneous correlated positioning.

If, in the white paint position, the relay R34/2 will close the contacts R34-1 and R34-2 (L11) to energize through the switch SW6G the white paint pump M2, but if color or Aztec copper is being supplied, the white paint pump M2 is not energized since it will be disconnected by the switches SW6J or SW6G. When the rotary switch SW6A is turned to the color paint position, the closing of the contacts R34-1 and R9-3 will energize the conductor 54.

The previously described energization of the relay R9A/9 also closes the contacts R9-3 (L12) so that, through the normally closed contacts R39-1 (L12) and the switch SW6A (L17) in the white No. 1 position, the white paint valve S1 (L16) is energized to permit the flow of white paint from the white paint supply conduit 32 (FIGURE 4) through the valve block 34 and the conduit 36 to the pump M2. Through the normally closed contacts R38-1, the three way solenoid valve S6 in parallel with the three way solenoid valve S1 opens the white paint valve 38 in the block 40 immediately above the rotating cone or disk 26 to provide a supply of white paint through the passage 39 in the block 40 and the conduit 56 extending to the cone or disk 26.

The solenoid valve S1 when deenergized connects the valve conduit 48 to the air pressure supply conduit 44 and when deenergized connects the valve conduit 48 to the air exhaust conduit 46 which delivers to the exhaust muffler 47. Thus, the solenoid valve S1 normally applies a pressure to the conduit 48 to keep the valve in the block 34 in the closed position. When the valve S1 is energized, it connects the operating diaphragm 35 of the valve in the block 34 to the exhaust conduit 46 to open the valve in the block 34 to connect the conduit 32 through the valve block 34 to the conduit 36 connecting with the inlet to the pump M2. The pump M2 pumps the white paint through the conduit 50 to the valve 38 in the block 40. The valve 38 is normally kept closed by air pressure passing from the air supply conduit 44 through the valve S6 and the conduit 52 to the valve in the block 38. The solenoid valve S6 like the solenoid valve S1 is a three way or double acting valve, which, when energized, connects the conduit 52 with the exhaust conduit 46 to open the valve 38 to allow the paint to flow from the conduit 50 through the valve 38 and the block 40 to the conduit 56 which delivers the paint to the cone 26 from which the paint is sprayed onto the cabinets 76. The three way solenoid valves S3-S6, S10-S20 and S25-S27 are similar to the solenoid valve S1 and similarly control the diaphragm valves in the valve blocks to which they are connected.

*Color painting*

To prepare for a change from white to color, the rotary switches SW8A to D (L94, L100, L104) are turned in unison to the desired color selected from the options, special S15, turquoise S16, charcoal S17, pink S18 and yellow S19. The switch SW8D (L100) simultaneously is moved to a corresponding position to provide a connection between the hold tank solenoid S11 and the normally open contacts R41-3. The energization through the SW8A switch cannot take place through the conductor as long as the SW6A switch is in the No. 1 white position because of the normally open position of the contacts R41-2 (L93) and the open position of the switch SW6A connecting with the conductor 54. The hold tank solenoid S11 will not be energized because of the normally open condition of the contacts R41-3 (L99).

To fill the color paint line or conduit 58 (FIGURE 4), the push button PB10 (L102) is closed. This energizes the relay R41/3 (S101) which closes the contact R41-2 (L93) and opens the contacts R41-1 (L96) to energize one of the color paint solenoids, such as S16, for one minute. This relay also closes the contacts R41-3 (L99) to complete the energization of the hold tank solenoid S11 (L100) also for one minute. This allows a flow of paint from the turquoise paint supply conduit 60 into the valve block 62 through the control by the solenoid valve S16 and through the color paint block 64 and the color paint conduit 58 into the color paint passage 66 in the white and color paint block 40 and out through the hold tank valve 68 controlled by the solenoid S11 and through the waste color paint conduit 69 to the waste color paint hold tank 70. The energization of the relay R33/2 (L102) by the momentary closing of the push button PB10 closes the contacts R33-1 (L103) to continue the energization of the relays R41/3, R33/2 and R32/1 after the push button PB10 is released. After one minute, the one minute bimetal time delay relay R32/1 operates to open the contacts R32-1 to deenergize the relays R41/3 and R33/2 to cause the opening of the contacts R33-1 to deenergize the relay R32/1 as well as to deenergize the turquoise solenoids S16 and the hold tank solenoid S11. The color paint lines are thus flushed of any other color paint and are now filled with turquoise without any interruption in the painting with white paint. For a change from white to color paint, at least five empty hangers 72 are provided upon the conveyor 74 (FIGURE 1) between the cabinets 76 desired to be painted with white and any cabinets desired to be painted with color. The switches SW6A to J are turned from the white to the color position during the passage of these empty hangers 72 through the spray booth 78.

*Automatic flush*

The occurrence of these empty hangers upon the conveyor will automatically activate the automatic flush system. The lights 80 mounted upon the pole 82 are directed across the path of the cabinets 76 in the booth 78 onto the photo cells PC1 to PC7 mounted at various heights upon the pole 84 (FIGURE 2). The cabinets 76 normally obstruct the light to the photo cells PC1 and PC2 and longer cabinets obstruct more of the light beams. The normally closed contacts of the photo cell PC2 (L74) through the contacts R44-4 (L72) will energize the ten second bimetal time delay relay R22/1 (L70) which serves as a flush timer. This also serves to energize directly the relay R30/1 (L70) to open its normally closed contacts connected in series with the normally open contacts of the photo cell PC2. The interruption of the light beam by the normal succession of the cabinets 76 will intermittently open the normally closed contacts of the photo cell PC2 and intermittently close the normally open contacts of the photo cell PC2. This interruption is more frequent than the ten second operation time of the relay R22/1 so that its operation is prevented by the normal succession of the cabinets and its contacts R22-1 remain normally open to prevent the energization of the relay coils R43/1 (L72) and R44A/5 (L66). The relay R30/1 has its energization continued briefly upon any opening of its supply circuit by the discharge of the capacitor C9.

When there are as many as five empty hangers in succession upon the conveyor, the normally closed contacts of the photo cell PC2 will remain closed for longer than the ten second minimum operating period of the relay R22/1, thereby causing it to operate to close its contact R22-1 to energize the relay R43/2 (L72). The energization of the relay R43/2 will close the contacts R43-1 (L66) and R43-2 (L68), thereby directly energizing the latch relay R44A/5 to open the contacts R44-4 (L72) to deenergize the relays R22/1 and R43/2 to open the contacts R22-1 and R43-1 and R43-2 (L68).

The energization of the latch relay R44A/5 also opens the contacts R44-5 (L37) to prevent the energization of the relay R2/2 when any of the bottom limit switches LS2, LS5 and LS7 to LS9 are closed. The opening of the switch R44-5 therefore prevents the closing of the switches R2-1 and R2-2 (L32) to prevent the energization of the reversing solenoid S8 so that the hydraulic piston 224 will be pushed to the bottom of its stroke and remain there. The output of the hydraulic pump 202, when the piston 224 reaches the bottom of its stroke under these circumstances, is absorbed by the flow through the by-pass pressure relief valve 203 from the output conduit 206 to the sump 204.

Through the closing of the contacts R43-2, the latch relay R23A/2 controlling the hydraulic reciprocating mechanism is energized to open the contacts R23-1 (L65) to deenergize the automatic flush paint latch coil R44B. The energization of the relay R23A/2 also closes the contacts R23-2 (L46) to prepare for continued energization of the flush circuit 30 upon closing of the contacts R7-1 (L43). Since the relay R23A/2 is a latch relay, it will remain in this position without continued energization. The energization of the relay R44A/5 closes the contacts R44-2 (L38) and opens the contacts R44-1. It also opens the contacts R44-5 to prevent the energization of the reversing relay R2/2 to prevent the closing of the switches R2-1, R2-2 to prevent energization of the bottom reversing solenoid S8. Also, the energization of the relay R44A/5 opens the contacts R44-3 (L64) to deenergize the relay R9A/9.

The closing of the contacts R44-2 makes it possible to energize the relay R6/2 when limit switch LS2 closes at the bottom of the hydraulic stroke. This is possible since the latch relay R9A/9 although deenergized by the opening of the contacts R43-3 will remain in the energized position since it is a latch relay and will not open the contacts R9-2 or R9-1 until the coil R9B is energized. This places the energization of the flush circuit 30 and the relay R6/2 (L38) under the control of the bottom limit switch LS2 (L37) so that the flushing action will not start until the cone 26 reaches the bottom of its stroke as determined by the closing of the limit switch LS2. The closing of limit switch LS2 energizes the relay R6/2 to open the relay contacts R6-1 (L22) to deenergize the hydraulic pump contactor 1CR/3 to stop the hydraulic pump M1 so as to hold the cone or disk in the bottom position during the entire flushing operation. The solenoid of relay R6/2 also closes the relay contacts R6-2 (L22) to energize through the conductor 252 the solenoid R9B (L23) which now opens the contacts R9-1 (L35), R9-2 (L37), R9-6 (L41) and R9-3 (L12) to deenergize the solenoid valve S1 to close the white paint valve 38. The contacts R9-8 (L9) are also opened to stop the electrostatic charge during the flushing operation. The relay R7/3 (L41) is energized simultaneously with the relay R6/2 to close the contacts R7-1 (L43) so that from the conductor 3 the energization of the flush circuit 30 is continued through the previously closed contacts R23-2 or the contacts R3-4 (L47), the push button PB3, the contacts R7-1 and the connection to line 30.

The energization of the conductor or line 30 energizes the cone flush solenoid S10 (L48), thereby opening the thinner and air valve 86 in the block 40 by connecting its diaphragm to the exhaust conduit 46 through the conduit 88. The transformer 90 (L49) for the flush timing circuit is also energized to energize the relay R12/1. The relay R12/1 is a bimetal time delay relay and does not operate until after it is energized five seconds. The relay R11/5 (L52) is therefore energized during this five second time delay interval to open the contacts R11-1 (L54) to prevent energization of the relay R15/3. The relay contacts R11-5 are closed to assure the energization of the line 30 during the entire flush period should the conveyor stop and open contacts R3-4. The relay contacts R11-3 (L52) are opened simultaneously to deenergize the relay R29/1 (L53) to reclose contacts R29–1 (L57) but will not energize the firelay R13/1 to open contact R13–1 to deenergize the conveyor circuit motor M and the relay R3/4 as long as either the contacts R3–3 (L58) or the contacts R8–1 (L56) remain open. A shut down of the conveyor circuit during the flush operation will prevent the starting of the conveyor circuit by closing the conatcts R3–3 which will energize the relay R13/1 to open the contacts R13–1 (L60). Relay R8/1 will not be energized because the contacts R7–2 will be open because of the energization of the relay R7/3 during the flush period.

The contacts R11–4 (L61) are closed during this five second period to energizet he thinner solenoid valve S4 for five seconds to flush out the spinning cone and the block. This provides a flow of liquid solvent or thinner from the thinner supply conduit 92 through the branch conduit 94 and the valve block 96 and thence through the thinner and air conduit 98 to the thinner and air inlet 121 in the valve block 40, thence through the diaphragm valve 86 and passages 123 and 39, through the outlet 125 and the conduit 56 into the cone 26. This flushes out the passages and the cone with thinner and removes the paint therefrom and thereby prevents the hardening of the paint anywhere in the painting apparatus.

At the end of the five second period, the bimetal relay R12/1 (L50) will open the contacts R12–1 (L52) to deenergize the relay R11/5. This will open the contacts R11–4 (L61) to open the thinner solenoid valve S4 to stop the flow of thinner and open contacts R11–5 and will reclose the contacts R11–3, R11–2, and R11–1. This will permit current to flow through the contacts R11–1 and R14–1 and through the relay R15/3 (L54) to close the contacts R15–3 (L62) to energize the air flush solenoid valve S3.

Current will also commence to flow through the bimetal timer relay R14/1. The energization of the solenoid valve S3 connects the corresponding diaphragm in the valve block 96 with the air exhaust system 46 to cause a flow of air or other gas from the air or other gas supply conduit 127 through the branch conduit 129, the valve block 96, the thinner and air conduit 98, the valve 86, the passages 123 and 39 in the block 40 and through the conduit 56 into the cone 26 to clear and remove the thinner and diluted paint from the conduits, the passages and the valves and the cone 26. The valve 86 in the block 40 remains open throughout the energization of the flush circuit 30 by the continued energization of the solenoid valve S10. The contacts R15–1 will also be closed to continue the energization of the flush circuit 30. The contacts R15–2 will be opened to deenergize the relay R29/1 to open the contacts R29–1 to keep deenergized the relay R13/1 to keep closed the contacts R13–1. After ten seconds, the bimetal relay R14/1 (L51) will operate to open the contacts R14–1 (L54) to deenergize the relay R15/3. This will open contacts R15–3 (L62) to deenergize solenoid air valve S3 to stop the air flush. This will also reclose contacts R15–2 to energize relay R29/1 to open contacts R29–1 to deenergize the relay R13/1 to reclose contacts R13–1 if open to reenergize the conveyor circuit motor CM and the relay R3/4. This will open contacts R3–4 and R3–2 and close contacts R3–1 and R3–3. However, under normal circumstances, the contacts R13–1 will remain closed and the conveyor in operation.

The foregoing flush circuit is also involved in the event that the conveyor is shut down for any reason. When the conveyor is shut down, the conveyor motor CM as well as the relay R3/4 (L62) will be deenergized. The contacts R3–1 (L64) and R3–2 (L15) will reclose. The opening of the contacts R3–1 will deenergize the relay R9A/9 while the reclosing of the contacts R3–2 through the conductor 254 will energize the relay coil R9B (L23). This will open the contacts R9–8 (L9) to deenergize the 110,000 volt electrostatic circuit and the contacts R9–3 (L12) will also be opened at the same time to deenergize the white paint solenoid S1 closing the corresponding diaphragm valve in the valve block 34 and the white paint valve S6 closing the valve 38 in the block 44 to stop the discharge of paint into the cone 26. The relay contacts R9–2 (L37) will also be opened to prevent the energization of the reversing relay R2/2 to stop the reversing of the cone 26 and to cause it to be stopped at the bottom of its stroke. The relay contacts R9–1 (L35) will also open to deenergize the relay R34/2 which will open the contacts R34–1 and R34–2 (L11) to stop the white paint pump motor M2. The stopping of the conveyor will also reclose the contacts R3–3 (L58) so that through the contact R33–2 (L57) and the contacts R7–2 (L56) the bimetal two minute relay R8/1 is energized. No flushing takes place during this two minute interval so that in the event that the conveyor is restarted within two minutes no flushing will take place and painting can resume immediately. After a two minute time delay, the bimetal relay R8/1 will operate to close its contact R8–1 to energize the flush circuit 30. This will cause the flushing operation in a manner similar to that previously described in which the thinner solenoid valve S4 is energized for five seconds and thereafter the air flush solenoid valve S3 is energized for five or ten seconds. The conveyor is prevented from operating or starting up during this flushing period by the deenergization of the relay R29/1 (L53) to reclose the contacts R29–1 (L57) to energize the relay R13/1 to open the contacts R13–1 (L60) in the conveyor circuit to prevent the energization of the conveyor motor CM. At the end of this flushing period, the conveyor motor CM may be restarted.

A manual flush is made possible by closing the push button switch PB1C (L14) which produces the same results as the closing of the contacts R3–2 (L15) as set forth above.

*White pump flush*

Provision is also made for flushing the white paint pump M2 and its circuit. The gang switch SW6A to J, inclusive, is first turned clockwise to the thinner pump flush position (the last clockwise) in which the switch SW6F (L21) energizes the relays R38/3 (L24), R39/3 (L25) and the solenoid valve S5 (L26). The solenoid valve S5 opens the corresponding valve in the white paint valve block 34, FIGURE 4, to allow flow from the thinner and air conduit 92 through the branch conduit 165 into and through the block 34 to the white paint conduit 36. The switch SW6C (L61) is simultaneously moved to the last clockwise position in which it connects the solenoid S4 to the supply conductor 3 so as to open the corresponding valve in the valve block 96 to provide flow from the thinner supply conduit 92 through the branch conduit 94 and a portion of the conduit 98 through the branch conduit 165, the valve block 34 and through the white paint conduit 36, the white paint pump M2, the white paint pump delivery conduit 50, the valve 38, the passage 39 in the valve block 40 and the conduit 56 to the cone 26. The energization of the relay R38/3 causes the closing of the contacts R38–2 (L20) and the opening of the contacts R38–1 (L18) to energize the valve S6 so as to open the valve 38 in the block 40. This relay also opens the contacts R38–3 (L48) to prevent the energization of the cone flush solenoid S10 which controls the flush valve 86 in the valve block 40 so that this valve 86 remains closed. The relay R39/3 (L25) opens the contacts R39–1 (L12) to prevent any supply of energy through the switch SW6A (L17) to either the white paint valve S1 (L16) or the color paint supply circuit 54. The contacts R39–3 (L35) are open but the contacts R39–2 (L34) are closed to energize the relay R34/2. The energization of this relay R34/2 closes the contacts R34–1 and R34–2 (L11) to energize the white paint pump M2 through the switch SW6G (L11). The switch SW6E in both the last and second last clockwise positions energizes the flush circuit 30.

The energization of the flush circuit 30 energizes the relay R11/5 (L52) to open the contacts R11–1 (L54) and R11–2 (L51) and R11–3 (L52) to deenergize the relays R15/3, R14/1 and R29/1. This causes the reclosing of the contacts R29–1 (L57) to energize the relay R13/1 through the contacts R3–3 (L58) which will be closed only if the conveyor circuit is deenergized to open the contacts R13–1 (L60) to deenergize the conveyor motor CM and the relay R3/4. If the conveyor is in operation, it must be either without any articles to be painted or it must be stopped manually. The relay contacts R11–5 (L54) are closed to connect the supply conductor 3 with the flush circuit 30 to insure the completion of the flushing operation. The bimetal relay R12/1 (L50) is also energized so that after five seconds it opens the contacts R12–1 (L52) to deenergize the relay R11/5 to open the contacts R11–5 (L54) and to close the contacts R11–2, R11–3 and R11–1. The relay R15/3 is then energized for a period of five or ten seconds to close the contacts R15–1 and open the contacts R15–2 to prevent the energization of the relay R29/1. The relay R14/1 is a bimetal timer relay which, after five or ten seconds, operates to open the contacts R14–1 (L54) to deenergize the relay R15/3 to return the contacts R15–1 to the open position and R15–2 to the closed position. The relay R6/2 is energized to open the contacts R6–1 (L22) to deenergize the magnetic contactor 1CR/3 to stop the hydraulic motor M1 which drives the hydraulic pump 202 while the contacts R6–2 are closed to energize the relay coil R9B to stop the paint system. The energizing of the relay coil R9B causes the opening of the contacts R9–2 (L37) and R9–6 (L41) to prevent the energization of the reversing relay R2/2 to stop the cone 26 at the bottom of its stroke. The relay contacts R7–2 (L56) are opened to prevent the energization of the bimetal relay R8/1. The switch SW6A to J is continued in this position until sufficient thinner has flowed through the white paint pump M2 to flush out the white paint lines.

The switch SW6A to J is then turned one position counterclockwise to the air pump flush position in which the switch SW6C deenergizes the solenoid valve S4 and the switch SW6D energizes the solenoid valve S3. This stops the flow of thinner from the conduit 94 through the valve block 96, the conduit 98 and the branch conduit 165 to the valve block 34. In the place of this, air flows from the air supply conduit 127 through the branch conduit 129, the valve block 96, a portion of the thinner and air conduit 98 to the branch conduit 165, through the valve block 34 and the white paint conduit 36, the white paint pump M2 and the white paint conduit 50, through the valve 38, the passage 39 and the conduit 56 to the cone 26 to clean out the thinner and dissolve paint from these lines and surfaces. When this is completed, the switch SW6A to J is turned to whatever further operation is desired.

The color paint lines may also be flushed manually. This is accomplished by first turning the gang switches SW8A, SW8C and SW8D to the extreme counterclockwise flush position which is two stations counterclockwise from the white position illustrated in FIGURE 8D. The switch SW8C (L104) and the switch SW8D, respectively, energize the solenoid valves S12 and S11 to provide a flow of thinner from the thinner supply conduit 92 through the branch conduit 167, the valve blocks 171, 62 and 64 which are connected in series laterally and through the color supply conduit 58, the valve 68, the conduit 69 into the color waste drum 70. When sufficient thinner has flowed through this circuit to sufficiently dilute the paint therein, the switches SW8A, SW8C and SW8D are moved simultaneously to the adjacent clockwise position (one position clockwise) which will deener-
gize the thinner solenoid valve S12 and energize the air flush solenoid valve S13 while the cone solenoid valve S11 remains energized. This will cause a flow of air from the air supply conduit 127 through the branch conduit 169, the lateral series connected valve blocks 171, 62 and 64, through the conduit 58, the passage 66, the valve 68, the conduit 69 into the color paint waste drum 70.

During normal painting, the piston 224 reciprocates the rotating cone 26 up and down to evenly distribute the paint upon the sides of the cabinets 76 and both edges of the doors 165 upon the hangers 72 and 163. The cabinets 76 enter the booth 78 with their front faces forward so that the front edges receive an adequate amount of paint. The front edges are therefore given preference over the rear edges which are of lesser importance. For efficient electrostatic application of the paint, the high voltage source PRI has one conductor 242 electrically connected to the cone 26 while the second conductor 244 is connected to the conveyor track 74 and, if desired, may also be connected to a ground 246. This provides a high electrical potential (110,000 volts) between the paint issuing from the cone so as to cause it to be attracted to the cabinet 76 and the doors 165.

Figure 3:
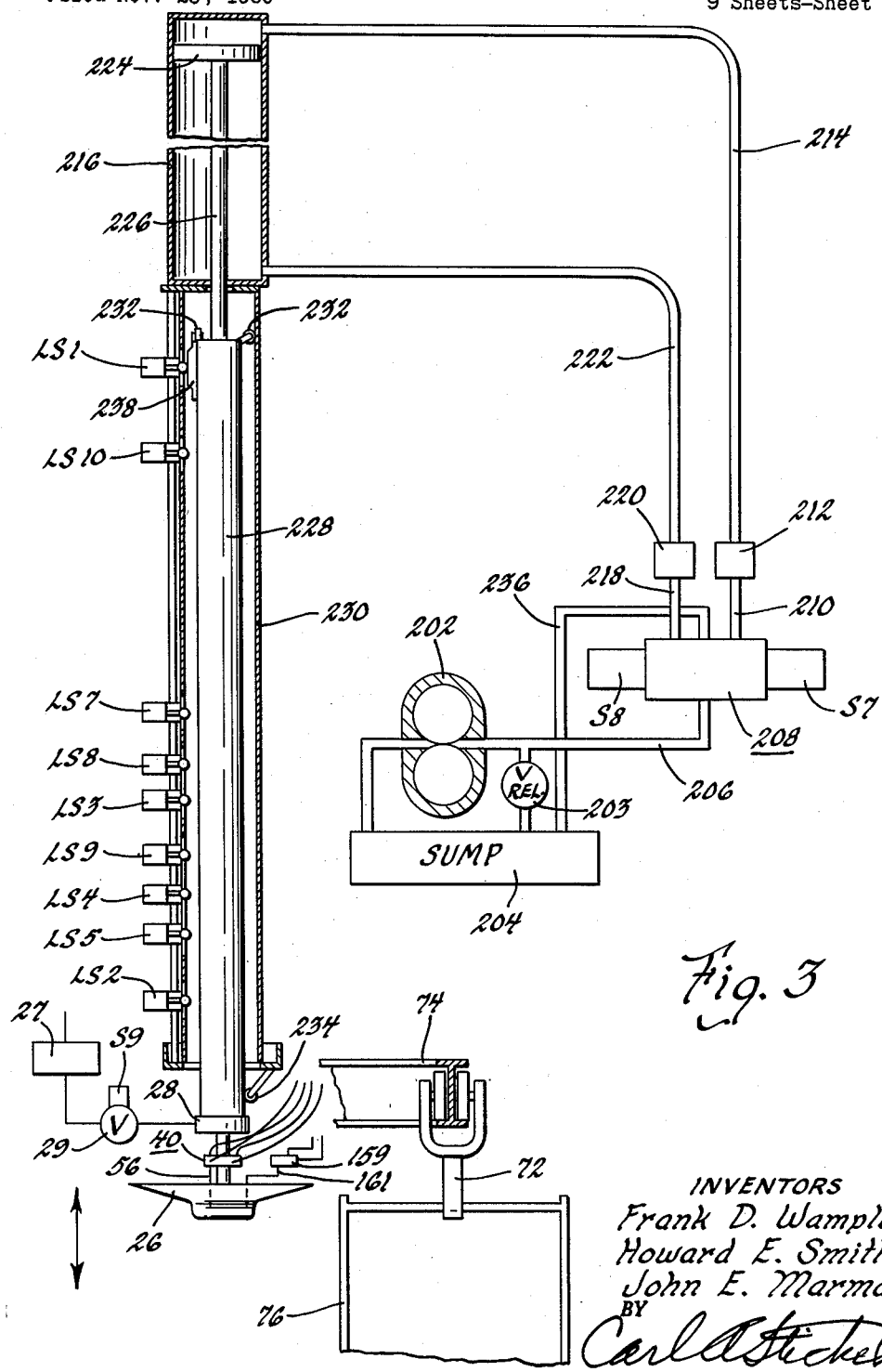
FIGURE 3 is a vertical sectional view, partly diagrammatic, of the paint spray system shown in FIGURE 1.
Figure 4:
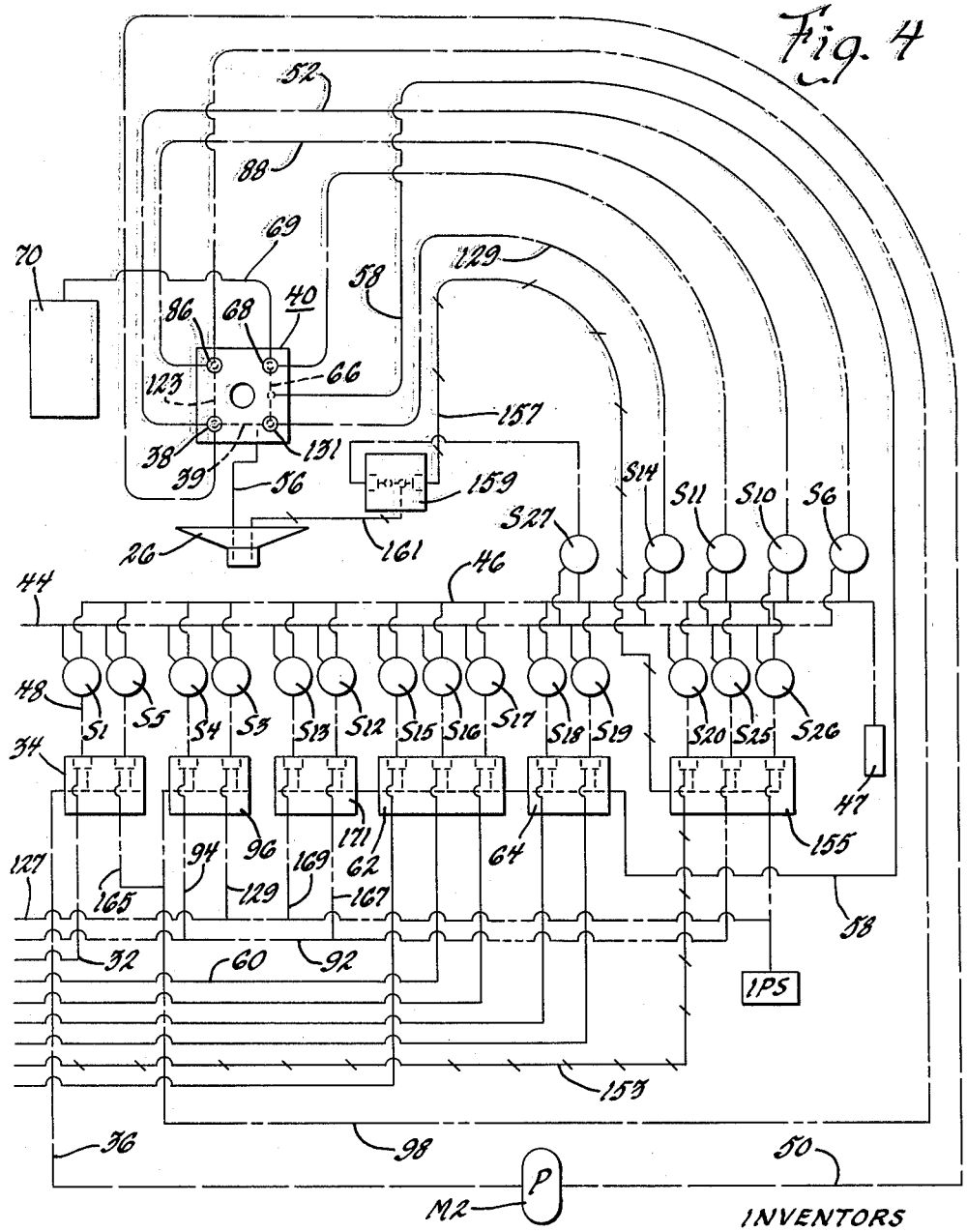
FIGURE 4 is a diagrammatic view of the paint supply system.
Figure 5:
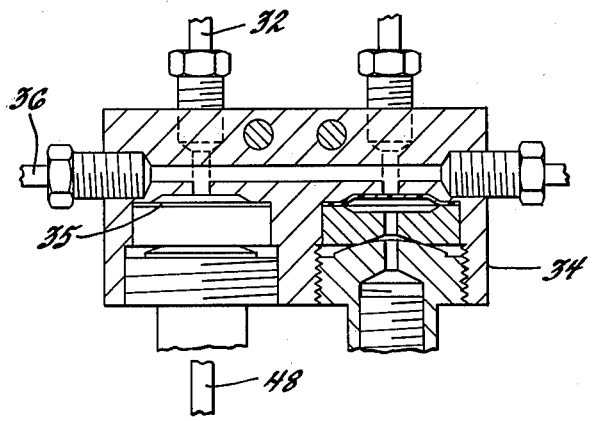
FIGURE 5 is a sectional view through one of the paint supply block valves.
Figure 6:
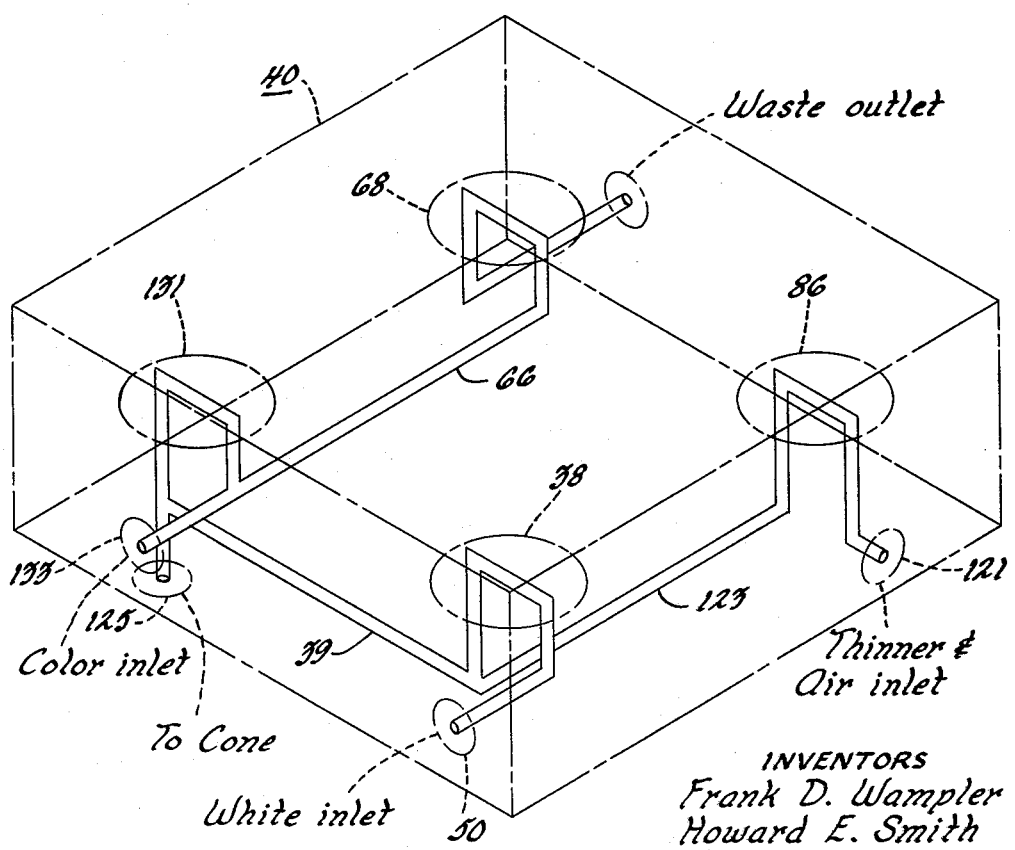
FIGURE 6 is a phantom isometric view, partly diagrammatic, of one of the paint cone block valves located adjacent the spray cone.

However, since cabinets of various length and doors of various length are run on the same apparatus with different top and bottom limits, both the top and the bottom limits of the piston 224 and the rotating cone 26 are adjused automatically in accordance with the top and bottom limits of the work being painted. For this purpose, the guide cylinder 230 is provided with upper and lower top limit switches LS1 and LS10 which cooperate with the limit switch operating cam 238 upon the guide rod 228. The upper top limit switch LS1 is located to reverse the position of the cone when it passes above the top limit of the cabinets 76 as shown in FIGURE 3. The lower top limit switch LS10 is located to operate when the rotating cone 26 passes above the top limit of the doors 165. The bottom limit of the cone 26 in the piston 224 is controlled by the limit switches arranged in the following order upon the cylinder 230: LS7, LS8, LS3, LS9, LS4, LS5 and LS2. These likewise cooperate with the cam 238 upon the guide cylinder 228.

For the purpose of measuring or ascertaining the top limits and the bottom limits of the cabinets 76 and the doors 165, there is mounted upon the post 82 a series of seven spotlights 80 having their beams directed across the path of the cabinets and doors through apertures in the wall of the booth 78 onto the photo cells PC1 to PC7, inclusive, mounted upon the pole 84 on the opposite side of the booth 78 as shown in FIGURE 1. The upper light 80 and the upper photo cell PC1 are located at such level that the light beam 81 extending between them will be obstructed by the cabinets 76 but not by the doors 165. Thus, when a cabinet 76 passes through the booth 78, it will obstruct the light beam 81 from the light 80 to the upper photo cell PC1. When the cone 26 and the pitson 224 rise, the limit switch LS10 will first be operated. The obstructing of the beam 81 by a cabinet to the photo cell PC1 (L30) will energize the relay coil R10/1 (L30) to open the switch R10–1 to render ineffective the limit switch LS10 so that, even though this limit switch LS10 closes, the relay R1/2 will not be energized to close the contact R1–1 and R1–2 (L31) to energize the hydraulic solenoid S7 until at a higher position the limit switch LS1 (L28) is closed by the cam 238 to cause reversal of the piston 224 and the rotating cone 26. If the light beam 81 to the photo cell PC1 is not obstructed, it will not operate and will not energize the relay R10/1 and the contact R10–1 will remain closed rendering effective the limit switch LS10 to energize the relay R1/2.

For controlling the lower end of the stroke of the cone 26 and the piston 224, the light beam to the photo cell PC2 will be obstructed when a cabinet of fifty-four inch length passes between its spotlight and its photoelectric element to cause its normally closed contact to open and its normally open contact to close. The relay R30/1 (L69) being energized by the normally closed contact of the photo cell PC2 will keep the relay contact R30–1 (L74) in the open position. This contact R30–1 will be kept in the open position for a brief period after the opening of the normally closed contact of the photo cell PC2 upon obstruction of the light beam thereto by the discharge of current from the capacitor C9 (L71) which insures that the photo cells PC3 to PC7 will not be energized prior to the operation of the photo cell PC2.

Therefore, upon obstruction of the light beam to and the operation of the photo cell PC2, after a brief interval, if the light beam to the photo cell PC3 is not obstructed, the relay contact R30–1 will, through the back contact of the photo cell PC3 and the conductor 246, energize the relay R16/1 (L84) to close the contacts R16–1 (L46), to make the limit switch LS7 when engaged by the cam 238 effective through the switches R44–1, R9–6 and R44–5, to operate the relay R2/2 to close the switches R2–1, R2–2 (L32), to actuate the bottom hydraulic solenoid S8, to cause the immediate reversal of the cone 26 and the piston 224. If the light beam to the photo cell PC3 is obstructed but the light beam to the photo cell PC4 is unobstructed, the normally closed contact of the photo cell PC3 will open to prevent the energization of the relay R16/1 and through the normally closed contact of photo cell PC4 and the conductor 248 energize the relay R17/1 (L82). This will cause closing of the contact R17–1 (L45) so that, upon the engagement of the operator of the limit switch LS8 by the cam 238, the relay R2/2 (L37) will be energized to close the contacts R2–1 and R2–2 (L32), to energize the bottom hydraulic solenoid S8, to cause immediate reversal of the piston 224 and the cone 26. The obstructing of the light beams to the photo cells PC2 to PC4, inclusive, and not to photo cells PC5 to PC7, inclusive, will cause a flow of current through the normally open contact of the photo cell PC4, the normally closed contact of photo cell PC5, the conductor 250 to the relay R18/1 to close the contacts R18–1 (L44) to cause the piston 224 to be reversed when the cam 238 closes the limit switch LS3.

The obstructing of the light to the photo cell PC5 will cause its normally open contact to close, thereby, through the normally closed contact of photo cell PC6 if not operated, to energize the conductor 252 and the relay R19/1 (L78) to close the contacts R19–2 (L42), to render effective the limit switch LS9 when closed by the cam 238, to energize the reversing relay R2/2 to close the contacts R2–1 and R2–2, to energize the lower hydraulic reversing solenoid S8. The obstructing of the light beam to the photo cell PC6 will cause its normally open contact to close, thereby energizing, through the normally closed contact of the photo cell PC7 if not operated, the conductor 254 and the relay R20/1 (L76) to close the contact R20–1 (L40), to render effective the limit switch LS4 when closed by the cam 238, to energize the reversing relay R2/2 (L37) to close the contacts R2–1, R2–2 (L32), to energize the bottom hydraulic reversing solenoid S8.

When the light beam is obstructed to the photo cell PC7, it will close its normally open contact to energize the relay R21/2 (L74), to energize the contacts R21–1 (L39), to render effective the limit switch LS5 when it is closed by the cam 238, to energize the relay R2/2 to close the contacts R2–1 and R2–2, to energize the bottom hydraulic solenoid S8 to reverse the hydraulic system. In each of these instances, the preceding photo cells (PC2–PC6) by opening their normally closed contacts prevent the energization of the relays controlled thereby (R16/1–R20/1). Each of the circuits to the relays R16/1 to R21/1 is provided with its own rectifier, identified as SR1 to SR6, inclusive, and resistances RS1 to RS6, inclusive, respectively, as well as resistances RS7 to RS12, inclusive, respectively. In parallel with these relays R16/1 to R21/1, inclusive, are the capacitors C1 to C6, inclusive, respectively. By this arrangement, the capacitors supply sufficient current between the successive cabinets to keep the relays R16/1 to R21/1 energized between the cabinets so that the switches R16–1 to R21–1 will remain closed through a succession of cabinets instead of operating for each cabinet in succession.

*Reciprocating the cone*

During the normal paint spraying, as mentioned previously, the cone or disk 26 is continuously reciprocated vertically by a hydraulic mechanism as shown in FIGURE 3. This is accomplished through a hydraulic pump 202 which is driven by the electric motor M1 under the control of the contactor 1CR/3 having the contacts 1CR1, 1CR2 and 1CR3. This hydraulic pump 202 pumps oil or other suitable hydraulic liquid from the sump 204 through a conduit 206 to a reversing valve 208 controlled by the solenoids S7 and S8. When the solenoid S7 (L31) is energized, the reversing valve 208 delivers the oil or hydraulic fluid through the conduit 210, the flow control device 212 and the conduit 214 to the top of the hydraulic cylinder 216. When the solenoid S8 (L32) is energized, it delivers the oil or hydraulic fluid through the conduit 218, the flow control device 220 and the conduit 222 to the bottom of the hydraulic cylinder 216.

The hydraulic cylinder 216 contains a piston 224 connected by the piston rod 226 to the guide rod 228 provided at the bottom with the air motor 28 and the cone or disk 26. The guide rod 228 is guided within the guide tube 230 by three upper rollers 232 connected to the rod 228 and three lower rollers 234 connected to the bottom of the tube 230. The flow control devices 212 and 220 are adjusted to compensate for the difference in displacement above and below the piston 224 by the presence of the piston rod 226. A return conduit 236 connects the reversing valve 208 to the sump 204. The relief valve 203 opens when the bottom reversing solenoid S8 is prevented from operating by the automatic control. The guide rod 228 carries a cam 238 which cooperates with and operates the upper limit switches LS1 and LS10 which control the reversing at the upper end of the stroke and also cooperates with and operates the limit switches LS7, LS8, LS3, LS9, LS4, LS5 and LS2 which control the bottom of the stroke.

Figure 8B:
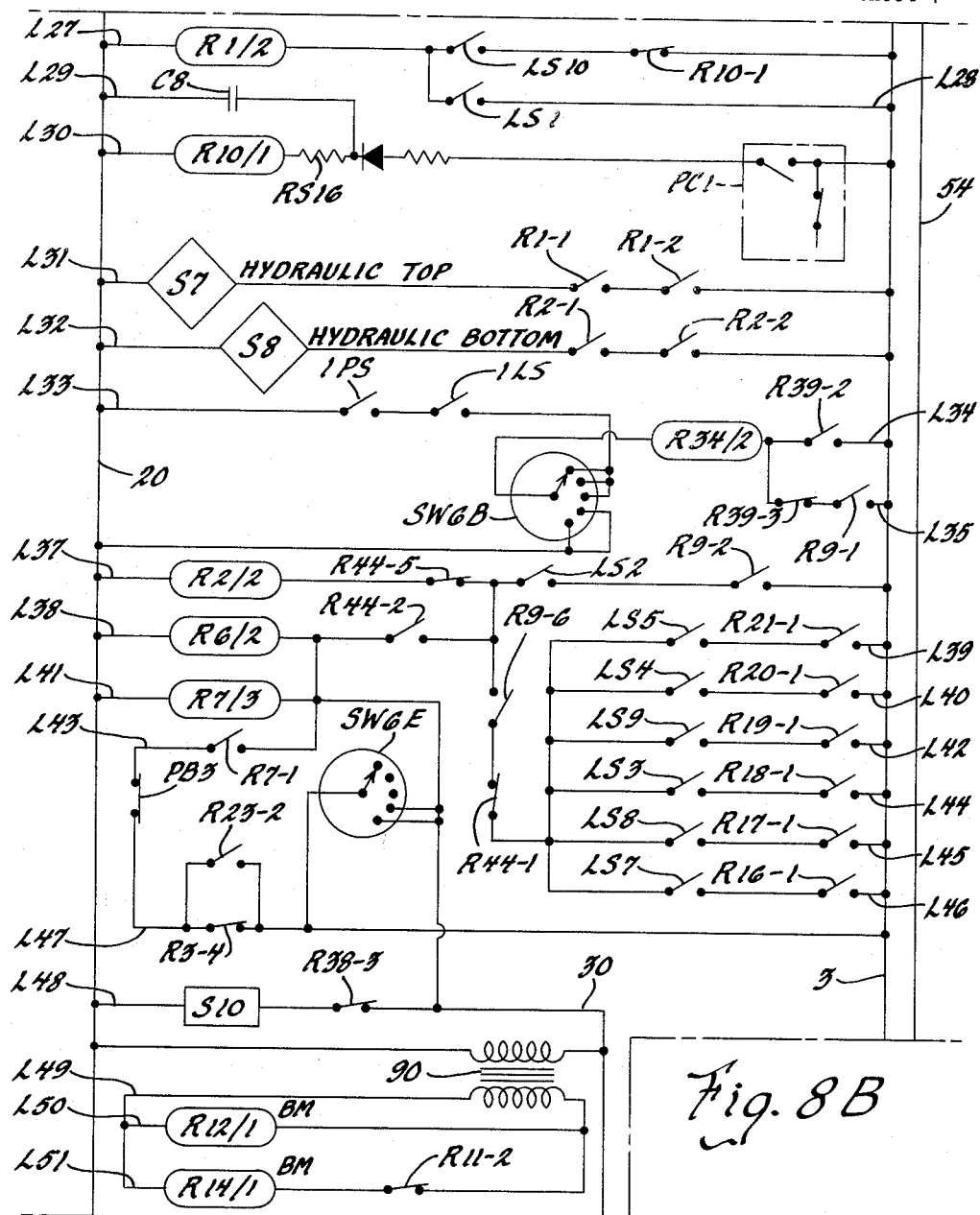
Figure 8C:
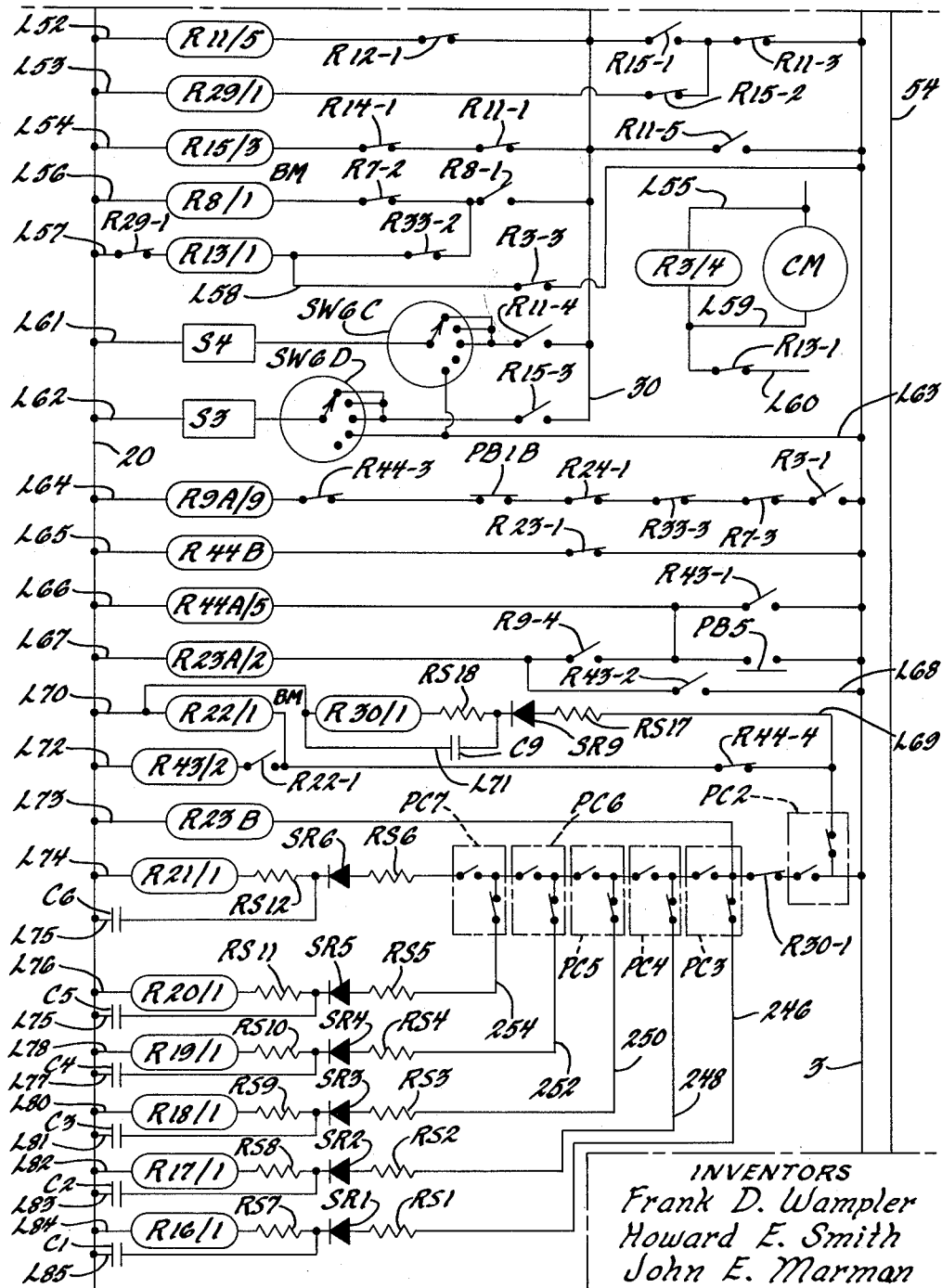
Figure 8D:
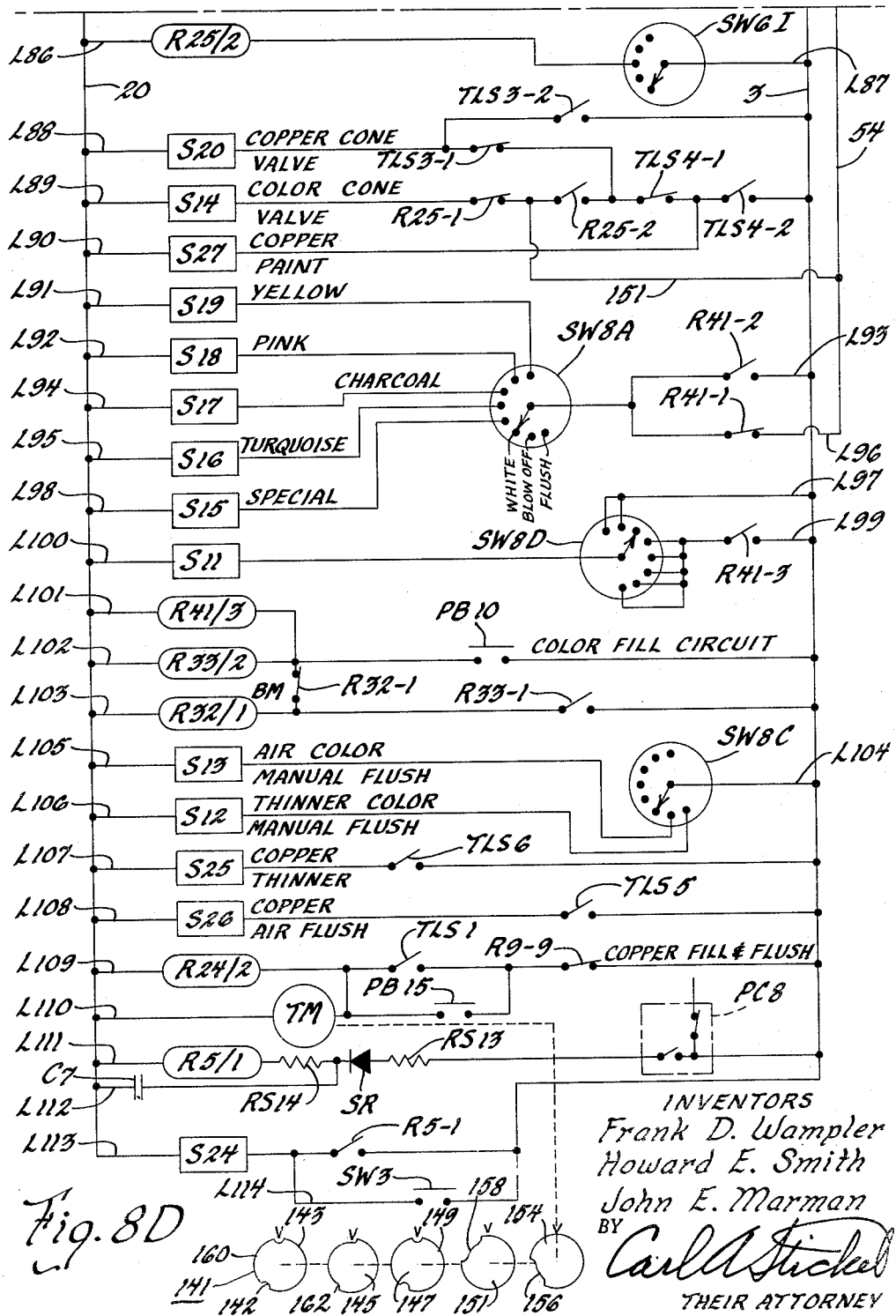

The cam 238 engages and operates the aforesaid limit switches to control the circuits shown in FIGURE 8B as previously explained. For example, limit switches LS10 (L27) and LS1 (L28) control the relay coil R1/2 which controls the contacts R1–1 and R1–2 (L31) for controlling the hydraulic solenoid S7 for accomplishing the reversal at the top of the stroke of the piston 224. The limit switch LS2 (L37) is connected in series with the contacts R9–2 and R44–5 to control the relay R2/2. The limit switch LS5 (L39) is in series with contacts R21–1. The limit switch LS4 (L40) is in series with the contacts R20–1. The limit switch LS9 (L42) is in series with the contacts R19–1. The limit switch LS3 (L44) is in series with contacts R18–1. The limit switch LS8 (L45) is in series with the contacts R17–1. The limit switch LS7 (L46) is in series with the contacts R16–1. These limit switches LS3 to LS9 are connected in parallel with each other and in series with the contacts R44–1 and R9–6 which connect between the contacts R44–5 and the limit switch LS2 for connection with the relay R2/2. The relay R2/2 when energized closes the contacts R2–1 and R2–2 (L32) in series with the bottom hydraulic solenoid S8 for accomplishing the reversal of the piston at the bottom of the stroke of the piston 224.

During the flushing period, the gang switch SW6A to J should be turned from white to colored if it is desired to change to color paint. During all this time, the cone or disk 26 is held at the bottom of its stroke since the bottom reversing relay R2/2 was deenergized and the hydraulic pump was stopped when the bottom limit switch LS2 was closed. The closing of the switch R13–1 resumes operation of the conveyor if the conveyor has stopped. At least five empty hangers are left on the conveyor between cabinets of different colors which allows sufficient time for the automatic flushing and the change of the switch SW6A to J. When the next cabinet obstructs the light to the photo cell PC2 (L74), its normally closed contact will open to deenergize the relays R22/1, R43/2 and the relay R30/1 which will, after a brief delay provided by the capacitor C9, open its contact R30–1 to insure the closing of the normally open contact of the photo cell PC2 before current flows to the photo cells PC3 to PC7. This assures the closing of upper photo cell PC2 even if the cabinets or articles upon the conveyor are not hanging vertically or are swinging. The deenergization of the relay R22/1 will open the contacts R22–1 to deenergize the relay R43/1 to open the contacts R43–1 and R43–2. This will deenergize the relays R44A/5 and R23A/2. During the short period in which both the contacts R30–1 and the normally open contact of the photo cell PC1 are closed, the relay coil R23B is energized to reclose the contacts R23–1 to reenergize the coil R44B. This will reclose the contacts R44–3 to reenergize the coil R9A/9 (L64). This will also reclose the contacts R44–1, R44–5 and R44–3 and open the contacts R44–2. The opening of contacts R44–2, R3–4 and R23–2 will then prevent the continued energization of the flush circuit. The energization of the relay coil R9A/9 will close the contacts R9–1 (L34) and R9–2 (L37). The closing of the contacts R9–1 will energize the relay coil R34–2 which will close the contacts R34–1 and R34–2 (L11). Since the gang switches SW6A to J have been turned to the color position, this will prevent energization of the white paint pump M2 and, through the normally closed switch R39–1, and the now closed switch R9–3 will energize the color paint conductor 54. This conductor 54 connects through the normally closed contacts R25–1 (L89) with the color paint solenoid valve S14. The color paint solenoid valve S14 (L89) is energized to connect the color valve conduit 129 with the exhaust conduit 46 to open the color paint diaphragm valve 131 in the block 40 to permit the flow of color paint from the conduit 58 into the color inlet 133. Also, the conductor 54 connects through the normally closed contacts R41–1 (L96) and the switch SW8A with the turquoise solenoid S16 (L95). The turquoise paint will then be supplied from the turquoise supply conduit 60 through the valve blocks 62, 64 and the conduit 58 to the color inlet 133 in the block 40 and the conduit 56 to the cone 26 for the application of turquoise paint.

*Copper painting*

A separate system is provided for metallic paints. To fill the metallic paint system with Aztec copper paint, all painting in the booth 78 must be stopped. This may be done prior to the start of operations or during a stoppage. During conveyor operation at a rate of six hangers per minute, more than eighteen empty hangers must be provided for the filling of the Aztec copper system if desired. This automatically flushes the valve block 40 and the cone 26, shutting off any flow of paint and energizing the latch release coil R9B (L23) to reclose the contacts R9–9 (L109) permitting the operation of the Aztec copper timer circuit. These contacts R9–9 are open during other painting to prevent the operation of the copper timer circuit. To start the filling, the Aztec copper timer circuit is activated by closing the push button PB15 (L110) until the timer motor TM turns a cam 141 to present its lobe 143 to close the switch TLS1 (L109) which continues for three minutes the energization of both the timer motor TM (L110) and the relay R24/2. This opens contacts R24–1 (L64) to deenergize the latch relay R9A/9 and closes contacts R24–2 (L14) to energize relay coil R9B (L23) to open the contacts R9–8 (L9) to prevent the application of the high electrostatic voltage. The contacts R9–3 also open to prevent energization of line 54 and to prevent the energization of the white paint solenoid valve S1 (L16) and the solenoid valve S6 to stop the flow of white paint. The contacts R9–1 (L35) open to prevent the energization of the relay R34/2 (L34) assuring the opening of the contacts R34–1 (L11) and R34–2 to deenergize the white paint pump M2. The opening of the contacts R9–2 (L37) and R9–6 (L41) prevent the energizing of the bottom relay R2/2 (L37) so as to stop the reciprocation of the cone or disk 26 at the bottom of its stroke. During this three minute period, the cam 145 operates to open its contact TLS3–1 (L88) and to close its contact TLS3–2 (L87) to energize the solenoid valve S20 from the energized conductor 3. Similarly, the cam 147 operates to present its lobe 149 to operate its contact TLS4–1 (L89) to open position, thus, in conjunction with the opening of the contacts TLS3–1, preventing the energization of the solenoid valve S14. At the same time, the lobe 149 operates the contacts TLS4–2 (L89) to closed position to energize the solenoid valve S27 (L90) from the energized supply conductor 3. The corresponding diaphragm valves in the Aztec copper valve blocks 155 and 159 are opened to provide a flow of Aztec copper paint from the supply conduit 153 through the valve block 155, the conduit 157, the valve block 159, the conduit 161 to the cone 26 for three minutes. At the end of the three minutes, the cam 141 reaches its stop notch 142 to open the switch TLS1 while the cam 145 reaches the notch 161 to return its contacts TLS3–1 to the closed position and TLS3–2 to the open position. This discontinues the energization of the solenoid valve S20. The cam 147 also reaches the notch at the end of its lobe 149 to open its contacts TLS4–2 and to reclose its contacts TLS4–1 to discontinue the energization of the solenoid valve S27. The Aztec copper paint system is now filled and ready for copper painting.

Following the filling of the Aztec copper paint system, painting with this paint is initiated by turning the switch SW6I (L86) and the remainder of the switches of this gang SW6 to the No. 3 Aztec copper position in which the relay R25–/2 is energized to open the color paint contacts R25–1 (L89) to deenergize the color paint solenoid valve S14 to close the color paint valve 131 in the block 40 and to close the Aztec copper paint contacts R25–2 to make possible the energization of the Aztec copper solenoid valves S20 (L88) and S27 (L90) through the normally closed contacts TLS3–1 and TLS4–1.

The operation of the conveyor 74 with the cabinets 76 thereon, following a series of empty cabinet hangers 72, will bring a cabinet 76 in position to obstruct the light beam of the photo cell PC2. This will close the normally open contacts of the photo cell PC2 and denergize the relays R24/2 and R30/1 which will permit, after a one second time delay, the closing of the previously open contacts R30–1, providing current flow to the photo cells PC3 to PC8. This assures that current will not flow to the photo cells PC3 to PC8 before the photo cell PC2 operates. This will also energize the relay coil R23B (L73) to reclose the contacts R23–1 (L65) to energize the relay coil R44B. This will open contacts R44–4 (L72) and deenergize relay R43/1 to open contacts R43–1 (L66) to prevent the energization of relay coils R23A/2 (L67) and R44A/5. Contacts R44–3 (L64) and R44–1 (L44) will reclose while contacts R44–2 (L38) will open to prevent the energization of the flush circuit 30. The closing of contacts R44–3 (L64) completes the energization of the coil R9A/9 which opens contacts R9–9 (L109) to prevent the energization of the Aztec timer circuit. The closing of the contacts R9–2 (L37) and R44–5 restores the bottom reversing relay R2/2 to normal operation.

The contacts R9–1 (L35) are closed to energize the relay R34/2 which closes contacts R34–1 (L11). The contacts R9–3 (L12) are also closed to energize through the gang switch SW6A the line 54 which through the conductor 151 and the now closed contacts R25–2 (L89) and the normally closed contacts TLS3–1 (L88) which energizes the Aztec paint valve S20. The Aztec block valve S27 is energized through the normally closed contacts TLS4–1. The energization of the color paint valve S14 is prevented by the opening of the contacts R25–1 by the relay R25/2. This provides for a flow of Aztec copper paint through the Aztec copper supply conduit 153, the valve block 155, the conduit 157 into the Aztec block valve 159 through the conduit 161 into the spinning cone or disk 26.

After completing the use of Aztec copper paint, the Aztec copper paint line is separately flushed by closing push button PB15 a second time until contacts TLS1 are again closed for two minutes by lobe 160 on the cam 141 driven by the timer motor M1. This assures the continued energization of the timer motor M1 as well as the relay R24/2 during the two minute flush period. The contacts R24–2 are closed to assure the energization of the relay R9B and contacts R24–1 are opened to prevent the energization of the relay R9A/9. The notch 162 on the cam 145 keeps closed the contact TLS3–1 (L83) and keeps open the contact TLS3–2 (L87) to deenergize the solenoid valve S20. The timer motor TM operates through the cam 147 the contacts TLS4–2 to closed position and the contacts TLS4–1 to open position for two minutes to energize the Aztec valve S27 to open the Aztec paint block valve 159 for permitting the flow of thinner and air through the Aztec line 157 and block 159. The cam 154 on the timer motor TM has a notch 156 which closes the thinner contact TLS6 for one minute to energize the Aztec thinner solenoid S25 for one minute to provide a flow of thinner from the thinner supply conduit 92 through the Aztec copper valve block 155 and the line 157. The timer motor TM continues this for one minute after which the thinner contacts TLS6 are opened and the air contacts TLS5 are closed by the notch 158 to deenergize the solenoid S25 and energize the Aztec copper air solenoid S26 to provide a flow of air from the air supply conduit 127 through the valve block 155, the conduit 157, the valve block 159 and the conduit 161 to blow out the Aztec copper lines until they are free of thinner and paint. This also flushes the spinning cone 26. All this takes place in the down position of the hydraulic reciprocator 216. After a minute application of the air, the timer motor TM stops by the opening of the contacts TLS1. The cams 147, 151 and 154 return the contacts TLS4–1 and TLS4–2 and the contacts TLS5 and TLS6 to their normal positions.

To actuate the hanger turning mechanism (FIGURE 7), those hangers 163 upon the conveyor 74 (FIGURE 1) carrying the doors 166 are provided with special flags 168 which obstruct the light beam from the light 170 upon the pole 172 to the photo cell PC8 (L111) upon the pole 173. This energizes the relay R5/1 to close contacts R5–1 (L113) to energize the air solenoid valve S24 to open the air line to the cylinder 175 (FIGURE 7) which through the lever 177 moves the door turning mechanism 179 to actuating position. As long as this mechanism 179 is kept in actuating position, the hangers 163 will be turned thereby whenever they are presented to the turning mechanism. The capacitor C7 provides a sufficient continuance of current to the relay R5/1 to allow the mechanism to remain in the turning position between the consecutive flags 167. At least three empty hangers 72 will be provided between the cabinets 76 and the doors 165 on the conveyor line 74.

The door turning mechanism 179 is provided with two adjustable brackets 181 and 183 which are adjustably mounted upon the arm 185. The bracket 183 supports the adjustable cam 187 which is aligned with an upper cam follower 189 mounted upon the hanger 167 for the doors 165. The cam follower 189 by its coaction of the cam 187 during the movement of the hanger 157 upon the conveyor 74 will turn the doors through 90°. A second adjustable cam 191 is adjustably mounted upon the bracket 181 and is in a lower plane than the cam 187 and the cam follower 189 so that it coacts with the cam follower 193 located upon the hanger 167 beneath the cam follower 189. When the hanger 167 has been turned through 90° by the coaction of the cam follower 189 with the cam 187, the cam follower 193 will be positioned transversely to the back 74 of the conveyor so that it engages the cam 191 to coact to turn the hanger 167 through a second 90° to complete a total turning of 180°. Any further turning is prevented by the spring mounted plate 192 which engages the side of the cam 193. This door turning mechanism 179 is arranged at the mid point of the passage of the hanger 163 through the booth 78 so that the one edge of the doors 165 is presented to the spinning cone or disk 26 through one-half of the travel through the booth 78 and the opposite edge thereof is presented throughout the remainder of the movement through the booth 78. In this way each edge receives the proper amount of paint and this is accomplished in a single booth 78.

While the embodiment of the present invention as herein disclosed, constitutes a preferred form, it is to be understood that other forms might be adopted.

What is claimed is as follows:

1. In a coating system for moving articles, a coating device, means for repeatedly moving said coating device relative to said articles, means responsive to the normal movement of the articles for supplying coating material to the coating device, and means including a time delay device responsive to an interruption of the normal movement of said articles in excess of a predetermined time for stopping the repeated movement of said coating device.

2. In a coating system for moving articles, a coating device, means for repeatedly moving said coating device relative to said articles, means responsive to the normal movement of the articles for supplying coating material to the coating device, means responsive to an interruption of the normal movement of said articles for stopping the repeated movement of said coating device in a predetermined position relative to said articles, means coincidentally stopping the supply of coating material to said device, and means thereafter coincidentally supplying a solvent and a gas in consecutive periods to said coating device.

3. In a coating system for moving articles, a coating device, a first coating material supply means for supplying a first coating material to said coating device, a second coating material supply means for selectively supplying a plurality of coating materials to said coating device, means automatically preventing the simultaneous functioning of said first and second supply means, and means for removing one coating material from said second supply means and charging said second supply means with another coating material during the normal functioning of said first supply means.

4. In a coating system for moving articles, a coating device, a first coating material supply means for supplying a first coating material to said coating device, a second coating material supply means for supplying a second coating material to said coating device, means for changing from said first coating material supply means to said second coating material supply means, and means responsive coincidentally to the change from said first supply means to said second supply means for moving said coating device to a predetermined position during said change.

5. In a coating system for moving articles, a coating device, a first coating material supply means for supplying a first coating material to said coating device, a second coating material supply means for supplying a second coating material to said coating device, means for changing from said first coating material supply means to said second coating material supply means, means for repeatedly moving said coating device relative to said articles during the operation of said first and second supply means, and means responsive coincidentally to the change from said first supply means to the second supply means for stopping said coating device in a predetermined position.

6. In combination, light source means, a plurality of double throw photo cells arranged to receive light from said light source means, said photo cells and light source means being located so that objects in the order of increasing dimensions will obstruct the light to an increasing number of photo cells in a predetermined order of succession, each of said cells having a normally open contact connected in series with the normally open contacts of the other cells and each having a normally closed contact connected in series with the normally open contact of the preceding photo cells, a plurality of limit controls arranged to be operated in a predetermined sequence, and individual electrical operating means each separately connected to the normally closed contact of one of said photo cells and each separately and individually operably connected to one of said limit controls for controlling the effectiveness of the corresponding limit control.

7. In a coating system for articles including conveyor means for moving the articles one by one in a predetermined arrangement through a path, a coating device, means for supplying coating material to said coating device, means for repeatedly moving said coating device relative to and adjacent said articles consecutively to apply the coating material to said articles, and means responsive to the absence in excess of a predetermined plurality of said articles in sequence from said predetermined arrangement for stopping the repeated movement of said coating device.

8. In a coating system for moving articles, a coating device, a white coating material supply means for supplying a white coating material to said coating device, a color coating material supply means for supplying color coating material to said coating device, selector means for supplying a plurality of different color coating materials to said color supply means, interlocking means automatically insuring the preventing of the simultaneous functioning of said white and color supply means, means for removing one color coating material from said color supply means and charging said color supply means with another coating material during the normal functioning of said white supply means, and timing means for stopping the charging of said color supply means with another color coating material after a predetermined charging period.

9. In a coating system for moving articles, a coating device, a white coating material supply means for supplying a white coating material to said coating device, means for electrostatically charging said coating device during the supply of coating material to said coating device, a metal containing coating material supply means for supplying metal containing coating material to said coating device, interlocking means automatically insure the preventing of the simultaneous functioning of said white and metal containing supply means, means for filling said second supply means with said metal containing coating material, and means for preventing the electrostatic charging of said coating device and stopping the supply of coating material by said white supply means during the filling of said metal containing coating material supply means.

10. In a coating system for articles, a coating device, a white coating material supply means for delivering a white coating material to said coating device, a color coating material supply means for delivering color coating material to said coating device, first valve means for stopping delivery of the white coating material from said white supply means to said coating device, second valve means for stopping delivery of color coating material from said color supply means to said coating device, interlocking means for preventing the concurrent opening of said first and second valve means, a plurality of different color coating material supply source means connected to said color supply means and provided with different color coating materials for supplying said color supply means, selective means for selectively controlling the supply from any one of said source means to said color supply means, and means for flushing said second supply means of one color coating material and filling said color supply means from another color of said source means selected by said selective means during an open period of said first valve means.

11. In a coating system for articles, a coating device, a white coating material supply means for delivering a white coating material to said coating device, a color coating material supply means for delivering color coating material to said coating device, first valve means for stopping delivery of the white coating material from said white supply means to said coating device, second valve means for stopping delivery of color coating material from said color supply means to said coating device, a plurality of different color coating material supply source means connected to said color supply means and provided with different color coating materials for supplying said color supply means, selective means for selectively controlling the supply from any of said different color source means to said color supply means, means for flushing said color supply means of one color coating material and filling said color supply means with another color coating material from another of said source means, a separate metal containing coating material supply means for delivering metal containing coating material separately to said coating device, means for filling said metal containing supply means with metal containing coating material, means for insuring the closing of both said first and second valve means during the filling and operation of metal containing coating material supply means, and a third valve means for stopping the delivery of said metal containing coating material from said metal containing coating material supply means to said coating device.

12. In a coating system for moving articles, a coating device, a white coating material supply means for supplying a white coating material to said coating device, a color coating material supply means for selectively supplying a plurality of color coating materials to said coating device, means automatically insuring the preventing of the simultaneous functioning of said white and color supply means, and means comprising electrically timed and controlled sequential control means for removing one color coating material from said second supply means and charging said second supply means with another color coating material.

13. In a coating system for different articles including conveyor means for moving the articles one by one in a predetermined arrangement through a path, a coating device, means for supplying coating material to said coating device, a selective turning means for said articles located adjacent said conveyor means, a beam of wave energy adjacent the path of movement of said articles, means associated with some of said articles for interrupting said beam, and means responsive to the interruption of said beam for selectively rendering effective said turning means to turn the article having means for interrupting said beam, said coating device comprising means for applying coating material to said articles before and after the article passes the turning means.

14. In an electrostatic paint spraying system, a paint delivery means, a first paint supply connection, a second paint supply connection, a solvent and gas inlet connection, a waste discharge connection, common conduit means connecting said connections with said delivery means, a valve means for closing each of said connections, means for opening said valve means for said first connection and closing said valve means for said second connection and said valve means for said solvent and gas inlet connection and said valve means for said waste discharge connection for delivering a first paint to said delivery means, means for opening said valve means for said solvent and gas inlet connection and for opening said valve means for said waste discharge connection and closing said valve means for said first and second connections for flushing with solvent and gas said common conduit means between said valve means and said delivery means and delivering the flushed material to the waste discharge connection, and means for opening said valve means for said second connection and closing said valve means for said first connection and said valve means for said solvent and gas inlet connection and said valve means for said waste discharge connection for delivering a second paint to the delivery means.

References Cited in the file of this patent

UNITED STATES PATENTS

| | | | |
|---|---|---|---|
| Re. 24,602 | Simmons | Feb. 17, | 1959 |
| 2,200,960 | Leavenworth | May 14, | 1940 |
| 2,257,004 | Fleming | Sept. 23, | 1941 |
| 2,281,169 | Pattison | Apr. 28, | 1942 |
| 2,467,989 | Porch | Apr. 19, | 1949 |
| 2,630,043 | Kolisch | Mar. 3, | 1953 |
| 2,660,978 | Dyne et al. | Dec. 1, | 1953 |
| 2,724,661 | Juvinall | Nov. 22, | 1955 |
| 2,878,058 | Gauthier et al. | Mar. 17, | 1959 |
| 2,894,485 | Sedlacsic | July 14, | 1959 |
| 2,952,351 | Stone | Sept. 13, | 1960 |
| 3,001,504 | Gengenbach et al. | Sept. 26, | 1961 |
| 3,027,273 | Sacks | Mar. 27, | 1962 |